(12) United States Patent
Hansen

(10) Patent No.: US 7,201,346 B2
(45) Date of Patent: Apr. 10, 2007

(54) CIRCULAR FIXED WING VTOL AIRCRAFT

(76) Inventor: Brad C Hansen, 4740 E. 500 South, Franklin, IN (US) 46131

( * ) Notice: Subject to any disclaimer, the term of this patent is extended or adjusted under 35 U.S.C. 154(b) by 0 days.

(21) Appl. No.: 10/422,577

(22) Filed: Apr. 25, 2003

(65) Prior Publication Data

US 2005/0205715 A1    Sep. 22, 2005

(51) Int. Cl.
    *B64C 15/00*    (2006.01)
(52) U.S. Cl. .................................... 244/12.1
(58) Field of Classification Search ............. 244/23 C, 244/12.1–12.6, 13–16, 17.11–17.27, 39, 23 R, 244/23 A, 23 B, 23 D, 5, 19–22
    See application file for complete search history.

(56) References Cited

U.S. PATENT DOCUMENTS

| | | | | |
|---|---|---|---|---|
| 1,838,248 | A * | 12/1931 | Bourland ................ | 244/17.23 |
| 2,468,787 | A * | 5/1949 | Sharpe ...................... | 244/12.1 |
| 2,718,364 | A * | 9/1955 | Crabtree ................... | 244/12.2 |
| 2,829,846 | A * | 4/1958 | Keiper ...................... | 244/23 C |
| 2,835,073 | A * | 5/1958 | Dame ....................... | 446/48 |
| 2,966,318 | A * | 12/1960 | Chodan .................... | 244/23 C |
| 3,917,195 | A * | 11/1975 | Oguri ....................... | 244/66 |
| 4,014,483 | A * | 3/1977 | MacNeill .................. | 244/5 |
| 4,269,375 | A * | 5/1981 | Hickey ..................... | 244/26 |
| 5,203,521 | A * | 4/1993 | Day .......................... | 244/12.2 |
| 5,351,913 | A * | 10/1994 | Cycon et al. ............. | 244/60 |
| 5,653,404 | A * | 8/1997 | Ploshkin ................... | 244/12.2 |
| 6,179,247 | B1 * | 1/2001 | Milde, Jr. ................ | 244/23 A |
| 6,371,406 | B1 * | 4/2002 | Corcoran ................. | 244/12.2 |
| 6,382,557 | B1 * | 5/2002 | Lafuma et al. .......... | 244/12.2 |
| 6,450,445 | B1 * | 9/2002 | Moller ..................... | 244/23 A |
| 6,575,402 | B1 * | 6/2003 | Scott ........................ | 244/12.2 |
| 6,581,872 | B2 * | 6/2003 | Walmsley ................ | 244/12.2 |
| 6,672,539 | B1 * | 1/2004 | Schoeneck ............... | 244/12.2 |
| 6,691,949 | B2 * | 2/2004 | Plump et al. ............ | 244/12.2 |
| 2003/0098388 | A1 * | 5/2003 | Walmsley ............... | 244/12.2 |

* cited by examiner

*Primary Examiner*—Teri Pham Luu
*Assistant Examiner*—Stephen Holzen
(74) *Attorney, Agent, or Firm*—Barnes & Thornburg LLP

(57) ABSTRACT

A VTOL aircraft includes a wing, a propulsion system, and an air dam. The propulsion system is located in a central void formed in the wing to cause air flow from an outer perimeter of the wing over the wing and down through the void to generate lift. The air dam is located over the central void to promote flow of air over the wing. The aircraft also may utilize sub-atmospheric pressure gas to reduce the relative weight of the aircraft.

13 Claims, 4 Drawing Sheets

Air Metro Aircraft, Cross Section View

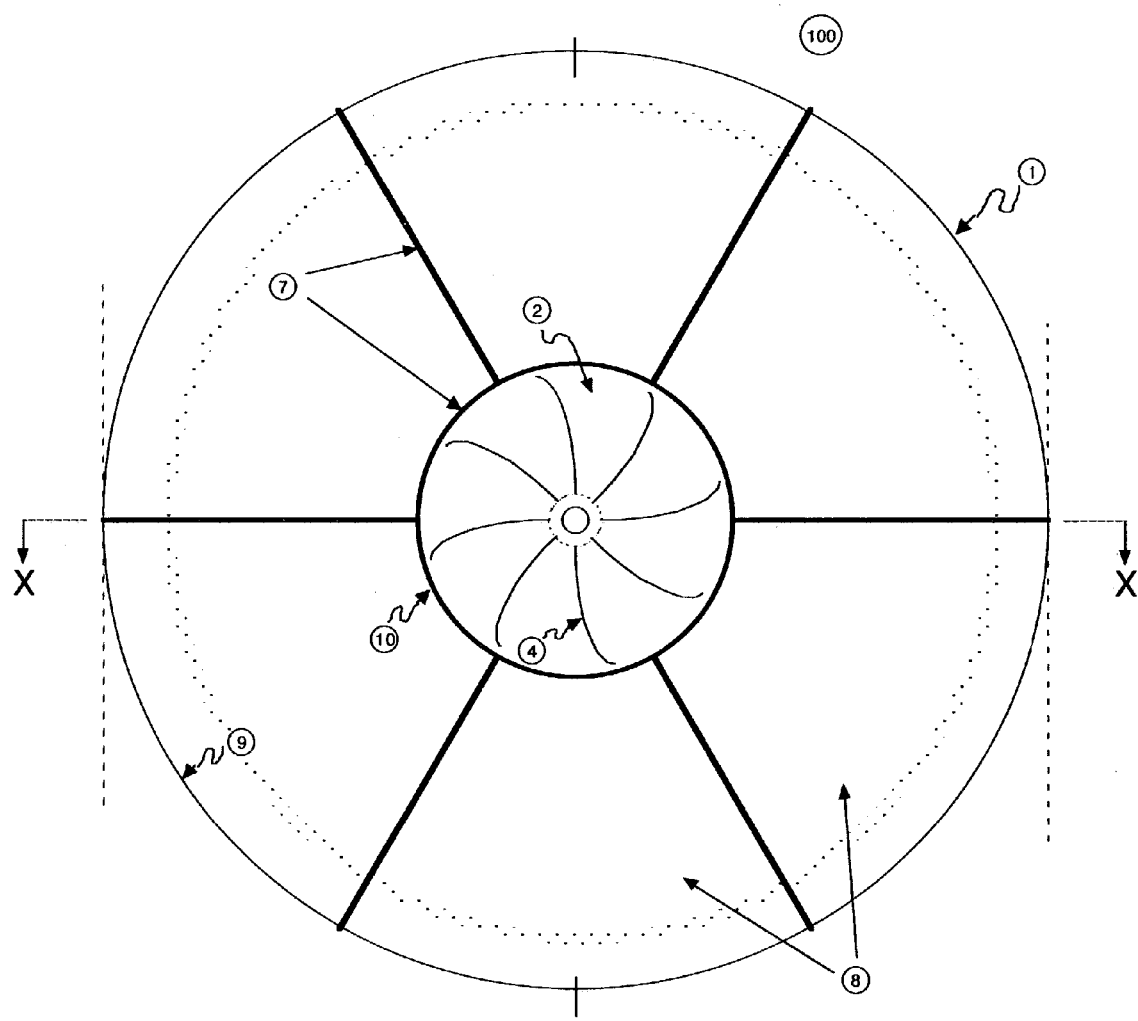
FIGURE 1: Air Metro Aircraft, Bottom Plan View

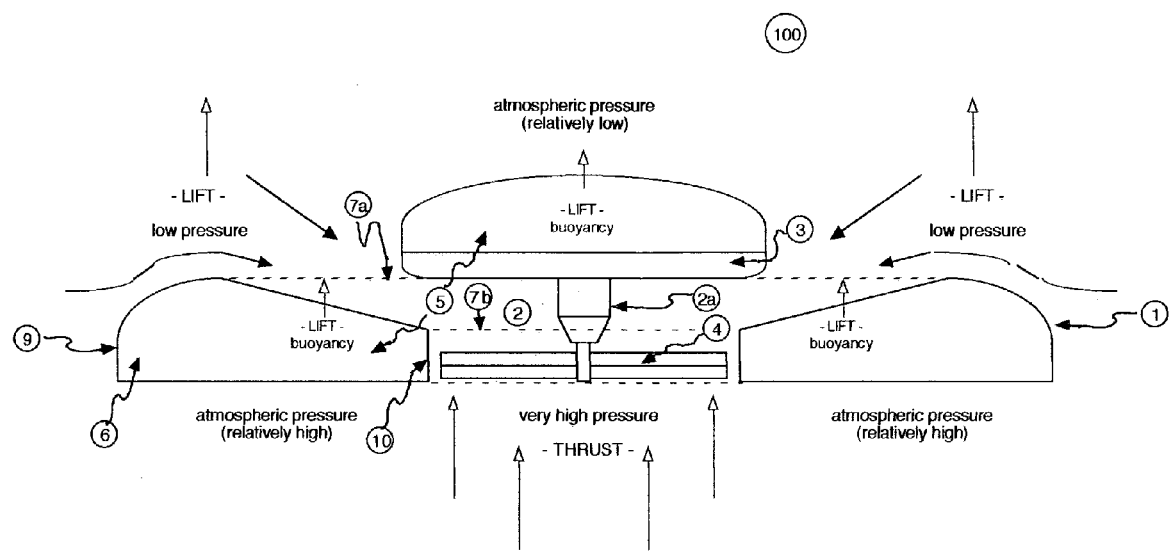
FIGURE 2: Air Metro Aircraft, Cross Section View

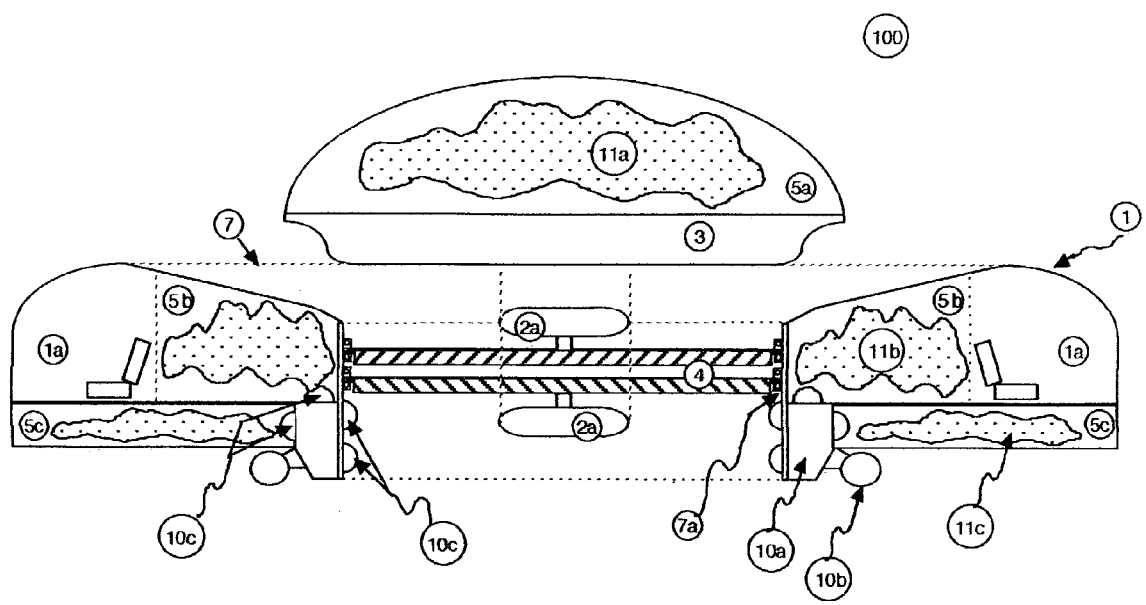
FIGURE 3: Air Metro Aircraft, Fuel Cell Powered

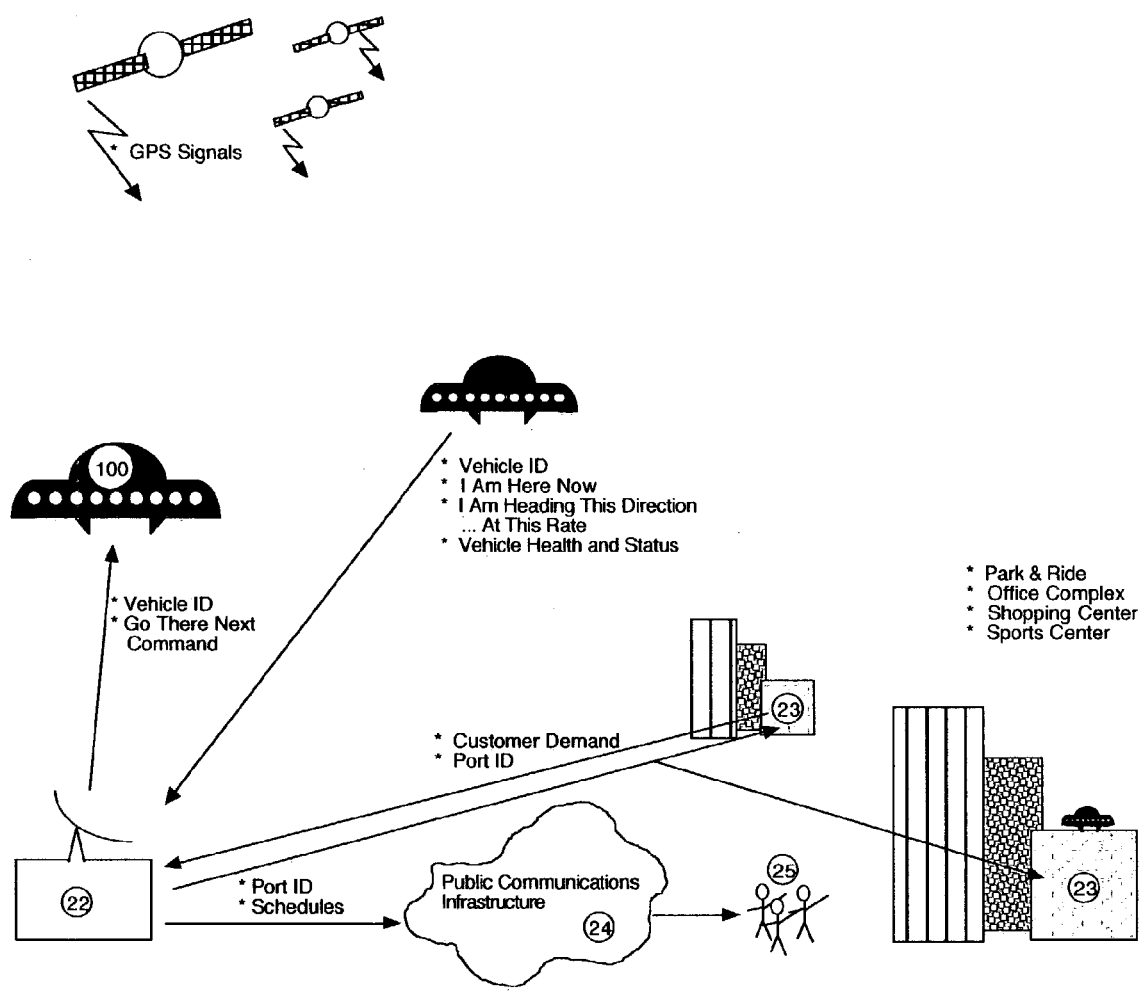
FIGURE 4: Air Metro Mass Transit Command & Control System

CIRCULAR FIXED WING VTOL AIRCRAFT

BACKGROUND OF THE INVENTION

1. Field of Invention

The present invention relates to aircraft, and particularly to vertical takeoff and landing (VTOL) aircraft.

2. Cross Reference to Related Documentation

USPTO Disclosure Document No. 492789, filed Apr. 26, 2001

Inventor: Brad C Hansen

Title: Circular Wing Vertical Takeoff and Landing Aircraft

3. Technical Background

Atmospheric flying machines (aircraft) fall into three general categories. The first category, fixed-wing, depends upon horizontal motion of the aircraft to generate vertical lift forces on the wing as the result of airflow over the wing. Lifting forces are generated due to the camber shape of the wing which causes the air flowing above the wing to move faster than the air below the wing, thus resulting in low pressure above the wing relative to that below the wing. Vertical forces are also generated on fixed wing aircraft at high horizontal speeds when the pitch angle of the wing relative to the horizontal wind is positive, exposing an increased surface area of the wing to the wind. The force of the air molecules hitting against the angled wing surface results in both horizontal (drag) and vertical (lift) forces on the wing. Since this type of aircraft requires horizontal motion before achieving vertical lift, ground runways are required.

The second general category of aircraft, vertical takeoff and landing, may generate vertical lift forces without initial horizontal motion by rotating unfixed wings or wing-like blades above or about the aircraft. Helicopters fall into this category. Another type of aircraft in this category simply generates large vertical thrust forces great enough to overcome the weight of the aircraft. The British Harrier falls into this category. Since horizontal motion of the aircraft is not needed to generate lift, this second category of aircraft does not require a runway.

A third general category of aircraft, the airship, uses the buoyancy of a contained gas that is lighter than surrounding atmospheric gases. When lifting force of buoyancy exceeds the weight of the container and anything attached to it, the airship rises. Hot air balloons and dirigibles fall into this category.

Each of these three categories of aircraft have advantages and drawbacks. Fixed-wing aircraft are better for long range flights because they can be aerodynamically designed for faster speeds, thus reducing travel time, and they are more efficient (cost/mile) than VTOL aircraft. But because of the need for a runway, fixed-wing aircraft become less practical as the distance traveled gets shorter, such as for local transportation. Existing VTOL aircraft, although better for short flights, are too expensive to operate, not only due to flight inefficiency but also because they are very mechanically complex and therefore are costly to build and maintain. This level of complexity, and tendency to break, leads to safety concerns when applied to its most useful application—short local flights over typically populated areas. Although efficient, airships are very slow and difficult to control, especially in high wind conditions.

What is needed for short local and regional flights is a revolutionary new type of VTOL aircraft that does not have the drawbacks of current VTOL aircraft. A VTOL aircraft is needed that is very efficient to operate and mechanically simple, thus reducing operating costs and recurring maintenance costs, and greatly reducing safety concerns.

SUMMARY OF THE INVENTION

The present invention addresses the needs described above. The VTOL aircraft of the present invention includes an aeronautical design that maximizes the efficiency of transforming fuel (potential energy) into vertical and horizontal aircraft movement (kinetic energy) through the air. This aircraft uses lift, thrust and buoyancy forces together to achieve high flight efficiency. This VTOL aircraft employs a unique fixed-circular-wing rather than rotary wings. The fixed-circular-wing of the present invention is designed to generate lift directly and not passively. The fixed-circular-wing of the present invention is also designed to function as part of the aircraft's cargo carrying fuselage. The aircraft of the present invention utilizes a power system located above the central void of the circular wing that moves air from the outer perimeter of the aircraft, over the top of the circular wing and through the center to below the aircraft. This central power system does not consist of rotary wings for the purpose of generating rotary-wing lift. The aircraft of the present invention utilizes an air dam above the central wing void that restricts air from directly above the void from being a source of air flow, and thus forces air flow over the circular wing generating lift forces on the wing. The air flow converging within the central area and expelled below the aircraft performs a double duty as it also produces thrust forces. The aircraft of this invention also utilizes lighter-than-air gases or heated air or heated light gases, either filling empty spaces within the airframe or applied in balloon-like containers either above the central air dam or below the circular-fixed-wing. These light gases cause a buoyancy effect that generate additional lifting forces, thus reducing the amount of energy needed to lift the aircraft and therefore improving operational efficiency. The aircraft of this invention is mechanically simple with relatively view moving parts, partly due to the absence of complex rotary wings. The aircraft of the present invention is also designed modularly to reduce production assembly costs and reduce recurring maintenance costs.

The VTOL aircraft defined by this invention are very efficient and safe, making plausible a second component of this invention, a dynamic aircraft resource allocation and scheduling software application and command-control-communication-computer (C4) system, herein referred to as Air Metro™, which can be used for mass transit application of multiple aircraft of this type in densely populated areas.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of the specification. The drawings illustrate various embodiments of the invention, and together with the description serve to explain the principles and operation of the invention.

BRIEF DESCRIPTION OF THE DRAWINGS

FIG. 1 is a plan view of the circular fixed wing VTOL aircraft in accordance with a first embodiment of the present invention with a conventional fossil fuel power source.

FIG. 2 is a cross section view of the aircraft taken through line X—X in FIG. 1.

FIG. 3 is a cross section view of the aircraft in a second embodiment that includes fuel cell power and the use of electric motors.

FIG. 4 is an illustration of an "Air Metro" mass transportation system that could become feasible with application of the aircraft invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the vertical take off and landing (VTOL) aircraft of the present invention is shown from a bottom plan view in FIG. 1, and is designated generally throughout by reference number 100.

In accordance with the invention, the present invention is directed to a VTOL aircraft. As depicted in FIG. 1, the aircraft includes a single annular wing 1 of a circular shape, an elliptical shape, or other symmetrical shape, with a void within the center 2, such that when viewed from the bottom has the appearance of a donut. A cross section of the wing has a conventional camber shape of a fixed wing aircraft. The radially outermost, leading edge of the wing 9 is at the outer diameter and the radially innermost, trailing edge of the wing 10 is at the inner diameter of the donut. The frame 7 of the aircraft consists of an inner ring and radial spars. Wing modules 8, adhering to the consistent camber shape, fasten to and between the radial spars with the trailing edge fastening to the frame inner ring. Powered fan pairs 4 spin in opposite directions within the area surrounded by the central frame ring.

Referring to FIG. 2, a cross-sectional view of the aircraft taken through line X—X in FIG. 1 is disclosed. The camber shape of the circular wing 1 and the central void within the circular wing 2 are revealed. The radial spars 7a extend vertically above the wing surface to support an air dam 3 and central propulsion system 2a that includes attached fan pairs 4. The air dam 3 is roughly the same shape as the frame ring 7b and sits above the ring and trailing edge of the wing 10. As the propulsion system 2a turns the fans 4, air is drawn from the top side of the wing downward. The purpose of the air dam 3 is to prevent air from directly above the fans from being a source of the air flow. Note that this is quite different from the rotary wing aircraft of current art. In the current invention air flows over the wing from the area outside the diameter of the air dam, including directly above the wing and from beyond the wing's leading edge 9. This airflow results is two complementary forces which propel that aircraft upward to overcome gravitation force on the aircraft. First, the airflow over the wing creates a symmetrical low pressure center above the wing relative to atmospheric pressure directly below the wing. Second, the air flow through the fans result in thrust forces against the fans which are mechanically connected to the aircraft. When the combined forces of lift and thrust exceed the weight of the aircraft, the aircraft moves vertically upward.

The wing 1 has means for altering the shape of the wing surface for controlling flight of the aircraft. The shape-altering means may be, for example, ailerons and/or flaps.

To reduce the lift and thrust forces needed to attain flight, lighter-than-air gasses are employed in sealed containers 5 either within the aircraft structure or in external containers positioned either above the aircraft with a diameter no greater than the outer diameter of the air dam 3, or, below the aircraft symmetrically positioned under the wing and without interference of fan airflow.

Horizontal movement of the aircraft results from tilting the aircraft which modifies the combined lift and thrust vectors from a pure vertical magnitude and direction to both vertical and horizontal vector components. Any conventional or unconventional means of varying the wing surface to vary lift, or to deflect thrust can be used.

FIG. 3 shows another cross section view of a possible embodiment of the current invention showing how fuel cells could be used for an electric powered aircraft that would have very few moving parts. In this embodiment the air dam 3 is also used to house avionics and/or other support subsystems. An external light-gas module 5a is attached directly above the air dam. Also, a donut shaped external light-gas module 5c is attached below the wing. Inside the wing 1 structure are two distinct areas. An outer area 1a is used for an isle and seating, thus utilizing the wing as the payload carrying container. The unused inner area of the wing 5b is filled with light-gas. Power is supplied by a fuel cell stack module 10a in a donut/ring shape. Removable hydrogen fuel tanks 10b are attached to the underside of the wing. Refueling is accomplished by removing empty fuel tanks and replacing them with filled tanks, or by refilling the tanks while on the aircraft.

The light-gas chambers may or may not be structurally sealed before being filled with gas. They may be deliberately unsealed and contain extremely light weight, flexible bladders that are partially filled with light gas. These bladders 11a-b-c expand as heat is applied to the gas inside, filling the chamber as they expand and forcing all heavier air out of the chamber. In the embodiment shown in FIG. 3 heat is supplied using heat energy byproduct 10c from the fuel cell stack, thus utilizing what would otherwise be waste energy. Once the gas filled bladders expand to fill chambers completely, the remaining heat is dissipated using heat dissipation fins 10d protruding into the path of air flow.

The electric energy supplied by the fuel cell stack 10a provides power for two electric motors 2a (e.g., linear induction motors or other types of electric motors) that drive the fans 4. The fans are secured by both the central motor shaft and retainer bearings on the frame ring 7a. The fans 4 of each fan pair can rotate in opposite directions with an equivalent rotational inertia. The two electric motors 2a provide an electric motor assembly configured to vary the rotational inertia between the two fans 4 of each fan pair to cause the aircraft to rotate about a central axis of the aircraft to change the heading of the aircraft.

The fans 4 may be rotated by use of a pair of engines of an engine assembly. Each engine may be, for example, an internal combustion engine (e.g., piston engine, rotary engine, turbine engine) or other type of engine. The engine assembly is configured to vary the rotational inertia between the two fans 4 of each fan pair to cause the aircraft to rotate about its central axis to change the heading of the aircraft.

The aircraft disclosed above is ideally suited for short duration VTOL flights, such as is needed for airborne mass transportation. A system for safe and efficient command and control of a plurality of such aircraft, either manned or unmanned, is herein disclosed. While described in reference to an application for mass transportation, it will become obvious to those skilled in the art that the disclosed system can be used for other commercial and military purposes. It should also be noted that the feasibility of any such system application, in terms of operational economy and safety, is greatly dependent upon the aircraft design disclosed above.

As portrayed in FIG. 4, an integrated command-control-communications-computer (C4) system for controlling and scheduling the aircraft for a mass transportation system consists of five major subsystems; a plurality of aircraft 100 disclosed above, an plurality of landing ports 23 where payload is both retrieved and delivered, a centralized master computer and communications facility 22, existing global positioning satellite (GPS) system 21, and existing commercial communications infrastructure 24 for broadcasting constantly changing schedules to the public.

Each aircraft utilizes GPS signal receivers to continually determine its current position and altitude. An on board computer uses recent history plus the current data to calculate current heading and velocity. This data plus other aircraft systems health and status data and a vehicle ID are then repeatedly transmitted to a central command and control facility. At the same or lower rate a plurality of destination ports are continually sending payload/customer demand information to the central command and control facility. This information includes at a minimum, a port ID, the number of waiting customers and their desired port destinations. The plurality of ports are strategically chosen to maximize customer demand. Locations would include park-and-ride parking lots that are in suburbs at locations easily accessed from residential areas, office complexes, shopping centers, sport centers, city centers and any other location that is a destination for high volume traffic.

The centralized master computer and communications facility is the overall controller of the C4 system. A primary component of the facility is a dynamic aircraft resource allocation and scheduling software application. It continually utilizes current and historical information received from all active aircraft and all active ports to recompute schedules and ultimately update and reissue destination commands to the active aircraft. The software uses weighted criteria for emphasizing customer delivery satisfaction and operational efficiency, which may or may not be compatible, for defining multiple schedule solutions and selecting a preferred solution. Next the current preferred solution is run through a simulation to insure there is no potential for aircraft collision within some defined distance limit. If the preferred solution fails, then the next solution is tried. Once a selected solution has passed the collision avoidance test, unique commands are generated and transmitted to each aircraft, and updated schedules are broadcast using any standard commercial means to the public (potential customers.)

What is claimed is:

1. A VTOL aircraft that uses lift, thrust and buoyancy forces together to achieve high flight efficiency, the aircraft comprising:

a continuous symmetrical wing that surrounds a central void, the wing comprising a radially outer most edge, a radially inner most edge, and a top surface extending between the radially outer most edge and the radially inner most edge and comprising a peak closer to the radially outer most edge than the radially inner most edge creating a camber wing cross section so that when air is pulled over the wing low pressure is created over the wing resulting in lift, a propulsion system that is located in the central void and moves air radially inwardly over the radially outer most edge of the wing, the top surface of the wing, and the radially inner most edge of the wing, through the center void, and downward below the aircraft resulting in thrust forces upward against the aircraft, an air dam that is located above the central void and restricts air located directly above the central void from being a source of air flow through the central void so that air is forced to flow over the wing from the radially outer most edge resulting in continuous symmetrical lift forces on the wing, and contained sub-atmospheric pressure gases causing a buoyancy effect resulting in additional lifting forces on the aircraft, wherein the sub-atmospheric pressure gases partially fill flexible bladders which are configured to expand in response to application of heat, and each bladder is housed in a cavity defined by an unsealed container.

2. The aircraft of claim 1, wherein the wing comprises means for altering the wing surface shape for flight control.

3. The aircraft of claim 1, wherein the wing surface shape is consistent about the center void.

4. The aircraft of claim 1, wherein the wing surface shape is configured to be varied inconsistently about the center void to attain horizontal flight of the aircraft.

5. The aircraft of claim 1, wherein the wing also serves as the fuselage for carrying payload or aircraft system components or subsystems.

6. The aircraft of claim 1, wherein the central air dam also serves as part of the fuselage for carrying payload or aircraft system components or subsystems.

7. The aircraft of claim 1, wherein a radial frame is used to interconnect the various system modules, including wing module segments, the radial spars extending outward from a central frame ring.

8. The aircraft of claim 1, wherein the propulsion system comprises fuel cells to generate electrical power.

9. The aircraft of claim 8, wherein the propulsion system comprises two fans and an electric motor assembly to rotate the two fans in opposite directions.

10. The aircraft of claim 1, wherein the propulsion system comprises two fans and an engine assembly to rotate the two fans in opposite directions.

11. The aircraft of claim 1, wherein the air dam is fixed against movement relative to the wing.

12. A VTOL aircraft that uses lift, thrust and buoyancy forces together to achieve high flight efficiency, the aircraft comprising:

a continuous symmetrical wing that surrounds a central void, the wing comprising a radially outer most edge, a radially inner most edge, and a top surface extending between the radially outer most edge and the radially inner most edge and comprising a peak closer to the radially outer most edge than the radially inner most edge creating a camber wing cross section so that when air is pulled over the wing low pressure is created over the wing resulting in lift, a propulsion system that is located in the central void and moves air radially inwardly over the radially outer most edge of the wing, the top surface of the wing, and the radially inner most edge of the wing, through the center void, and downward below the aircraft resulting in thrust forces upward against the aircraft, an air dam that is located above the central void and restricts air located directly above the central void from being a source of air flow through the central void so that air is forced to flow over the wing from the radially outer most edge resulting in continuous symmetrical lift forces on the wing, and contained sub-atmospheric pressure gases causing a buoyancy effect resulting in additional lifting forces on the aircraft, wherein the sub-atmospheric gases are contained in a flexible bladder located in the wing.

13. A VTOL aircraft that uses lift, thrust and buoyancy forces together to achieve high flight efficiency, the aircraft comprising:

a continuous symmetrical wing that surrounds a central void, the wing comprising a radially outer most edge, a radially inner most edge, and a top surface extending between the radially outer most edge and the radially inner most edge and comprising a peak closer to the radially outer most edge than the radially inner most edge creating a camber wing cross section so that when air is pulled over the wing low pressure is created over the wing resulting in lift, a propulsion system that is located in the central void and moves air radially inwardly over the radially outer most edge of the wing, the top surface of the wing, and the radially inner most edge of the wing, through the center void, and downward below the aircraft resulting in thrust forces upward against the aircraft, an air dam that is located above the central void and restricts air located directly above the central void from being a source of air flow through the central void so that air is forced to flow over the wing from the radially outer most edge resulting in continuous symmetrical lift forces on the wing, and contained sub-atmospheric pressure gases causing a buoyancy effect resulting in additional lifting forces on the aircraft, wherein the sub-atmospheric gases are contained in a flexible bladder located in the air dam.

* * * * *